United States Patent
Kurose et al.

(10) Patent No.: US 7,409,215 B2
(45) Date of Patent: Aug. 5, 2008

(54) MOBILE COMMUNICATION HAND-OFF CONTROL SYSTEM AND UNIT

(75) Inventors: Kengo Kurose, Ome (JP); Miyuki Ogura, Tachikawa (JP); Naritoshi Saito, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 242 days.

(21) Appl. No.: 10/772,344

(22) Filed: Feb. 6, 2004

(65) Prior Publication Data

US 2004/0157608 A1    Aug. 12, 2004

(30) Foreign Application Priority Data

Feb. 7, 2003   (JP)   ............... 2003-030510

(51) Int. Cl.
*H04Q 7/00*    (2006.01)
*H04B 7/216*   (2006.01)

(52) U.S. Cl. .................. 455/436; 455/437; 455/438; 455/439; 455/442; 370/331; 370/332; 370/333; 370/342

(58) Field of Classification Search ......... 455/436–439; 370/331–335, 342
See application file for complete search history.

(56) References Cited

U.S. PATENT DOCUMENTS

| | | | | |
|---|---|---|---|---|
| 5,666,650 A | * | 9/1997 | Turcotte et al. ............. | 370/329 |
| 5,854,785 A | * | 12/1998 | Willey ........................ | 370/332 |
| 5,854,981 A | * | 12/1998 | Wallstedt et al. ............ | 455/439 |
| 5,953,320 A | * | 9/1999 | Williamson et al. ......... | 370/252 |
| 5,974,318 A | * | 10/1999 | Satarasinghe ............... | 455/436 |
| 6,112,089 A | * | 8/2000 | Satarasinghe ............... | 455/437 |
| 6,188,904 B1 | * | 2/2001 | Marsan ........................ | 455/450 |
| 6,201,968 B1 | * | 3/2001 | Ostroff et al. ............... | 455/436 |
| 6,421,328 B1 | * | 7/2002 | Larribeau et al. ........... | 370/329 |
| 2002/0037726 A1 | * | 3/2002 | Czaja et al. ................. | 455/442 |
| 2002/0077103 A1 | * | 6/2002 | Bonta .......................... | 455/436 |
| 2003/0078043 A1 | * | 4/2003 | Horwath et al. ............. | 455/436 |

FOREIGN PATENT DOCUMENTS

| | | |
|---|---|---|
| JP | 2001-054156 | 2/2001 |
| JP | 2002-171555 | 6/2002 |

* cited by examiner

*Primary Examiner*—William Trost
*Assistant Examiner*—Ariel Balaoing
(74) *Attorney, Agent, or Firm*—Finnegan, Henderson, Farabow, Garrett & Dunner, L.L.P.

(57) ABSTRACT

When a first base station serving a mobile communication terminal in a standby mode, a first neighbor list is acquired from the first base station and stored in a memory. If the serving base station is changed in a standby mode from the first base station to a second base station, a second neighbor list is acquired from the second base station. When the second base station is serving the mobile communication terminal in a standby mode, the communication quality between the mobile communication terminal and each second peripheral base station listed in the acquired second neighbor list, and between the terminal and each first peripheral base station listed in the stored first neighbor list. Based on the measurement results, a peripheral base station that satisfies a preset condition is selected as a hand-off destination candidate.

12 Claims, 4 Drawing Sheets

MOBILE COMMUNICATION HAND-OFF CONTROL SYSTEM AND UNIT

CROSS-REFERENCE TO RELATED APPLICATIONS

This application is based upon and claims the benefit of priority from the prior Japanese Patent Application No. 2003-030510, filed Feb. 7, 2003, the entire contents of which are incorporated herein by reference.

BACKGROUND OF THE INVENTION

1. Field of the Invention

The present invention relates to a mobile communication terminal for use in a cellular mobile communication network system.

2. Description of the Related Art

In a cellular mobile communication network system, a plurality of base stations are provided in a service area, and each base station forms a radio zone called a cell. In each cell, the corresponding base station is connected by radio to mobile communication terminals. In this system, when a mobile communication terminal is turned on, synchronization is established between the terminal and the closest base station. After the establishment of synchronization, the terminal shifts to a standby state. In the standby state, an incoming call is transmitted from the base station to the terminal, or negotiation is performed for establishing a communication link between the terminal and base station if the terminal performs an operation for an outgoing call. When the communication link is established, the terminal shifts to a communication state.

In a cellular mobile communication network system, hand-off is performed when a mobile communication terminal moves from a cell to another cell. "Hand-off" means a process for changing, to another, the base station as a synchronization establishment destination. In the standby state and communication state, a mobile communication terminal acquires, from the base station with which synchronization is established (hereinafter referred to as an "active base station"), a neighbor list message listing the base stations located near the active base station. The mobile communication terminal searches for the neighboring base stations, using this message, and performs hand-off processing, if necessary.

For example, in a system employing a code division multiple access (CDMA) method, in which a mobile communication terminal establishes synchronization with a base station using sliding correlation therebetween, each base station transmits a pilot signal diffused by a diffusion code. The diffusion code used to diffuse the pilot signal is provided with an initial phase offset value, which varies between base stations. Each mobile communication terminal receives pilot signals transmitted from peripheral base stations, using the offset values recited in the neighbor list message, thereby measuring the reception quality of the pilot signals. The measurement of reception quality is performed by, for example, detecting the signal/interference-wave ratio (SIR) or reception-signal level. Based on the measurement results, the mobile communication terminal selects a peripheral base station of the best reception quality, and uses this base station as a destination candidate with which synchronization is to be established.

On the other hand, if all the measured reception quality levels are lower than a reference value, the mobile communication terminal determines that there is no appropriate base station for a destination candidate. In other words, it is determined that all peripheral base stations are out of range. After that, the terminal searches the base stations over all phases of the diffusion code used to diffuse pilot signals, and selects the base station from which the best reception quality can be acquired. Searching over all phases of a diffusion code corresponds to initial resetting for selecting a base station upon the turn-on of the mobile communication terminal. Accordingly, this operation requires a lot of time and power consumption. If it is performed frequently, the battery life of the terminal is shortened.

For various reasons, "Out of Range" determination is made. For example, the acquired neighbor list may become an inappropriate one due to a change in the positional relationship between the mobile communication terminal and base stations.

FIG. 4 is a view useful in explaining such a case. In the figure, assume that a mobile communication terminal MS establishes synchronization with a base station BS-A, and the neighbor list acquired from the active base station BS-A lists a peripheral base station BS-B. In this state, even if the terminal MS moves to a second position, the communication state does not change. However, if the terminal MS further moves to a third position, the communication between the terminal and base station BS-A is interrupted by an obstacle 1. At this time, the terminal MS hands off from the base station BS-A to the peripheral base station BS-B listed in the neighbor list.

After that, if the terminal MS moves to a fourth position, communication with the base station BS-B is interrupted by an obstacle 2. The fourth position is close to a base station BS-C. However, if the neighbor list acquired from the base station BS-B does not list the base station BS-C, and a pilot signal of sufficient reception quality cannot be acquired from any other peripheral base station listed in the neighbor list, the terminal MS determines that it is out of the range of the base stations listed in the neighbor list. In this case, the mobile communication terminal MS must perform the above-mentioned searching over all phases of a diffusion code.

Since the transmission lines for mobile communication are very complex, it is difficult to prepare a neighbor list that enables optimal hand-off processing to be executed in all positions in its service area. Therefore, it is a frequent practice to perform searching over all phases of a diffusion code.

There are known techniques for reducing the power consumption of a mobile communication terminal by shortening the time required for base-station searching for hand-off. Jpn. Pat. Appln. KOKAI Publication No. 2002-171555, for example, discloses the following technique (pages 2 to 5 and FIG. 1): When a mobile communication terminal selects a peripheral base station as a hand-off destination candidate, it stores, in its database, information indicating the base station, together with positional information indicating the position of the terminal itself. When the terminal again enters the cell indicated by the positional information, it selects the information, stored in the database, in preference to a neighbor list acquired from a base station corresponding to the cell. Based on the selected information, the terminal searches the peripheral base stations for a hand-off destination candidate. This search technique, however, requires a function for acquiring information indicating the position of a mobile communication terminal, which increases the circuit scale of the terminal and the amount of processing by the CPU of the terminal.

Further, Jpn. Pat. Appln. KOKAI Publication No. 2001-54156 discloses a technique for searching for a pilot signal transmitted from a peripheral base station, acquiring a neighbor list from the base station detected by searching, and selecting a hand-off destination candidate from the acquired neighbor list. In this technique, to acquire a neighbor list from a peripheral base station, a mobile communication terminal holds synchronization with the active base station, while periodically searching peripheral base stations other than the active one to select an accessible base station. After selecting the accessible base station, the terminal must perform processing for acquiring a neighbor list therefrom. This processing significantly reduces the battery life of the terminal.

BRIEF SUMMARY OF THE INVENTION

It is an object of the invention to provide a mobile communication terminal capable of efficiently selecting a base station as an appropriate hand-off destination candidate, without acquiring information indicating the position of the terminal itself, or neighbor lists from peripheral base stations, thereby reducing the power consumption of the terminal and increasing its battery life. It is another object of the invention to provide a base-station selection method employed in this mobile communication terminal.

To attain the objects, in a mobile communication terminal according to an embodiment, a first neighbor list is acquired from the first base station serving the mobile communication terminal in a standby mode, and stored in a memory. If the serving base station is changed in a standby mode from the first base station to a second base station, a second neighbor list is acquired from the second base station. When the second base station is serving the mobile communication terminal in a standby mode, the communication quality between the mobile communication terminal and each of the second peripheral base stations listed in the acquired second neighbor list is measured. Further, the communication quality between the mobile communication terminal and each of the first peripheral base stations listed in the stored first neighbor list is measured. Based on the measured communication quality, a peripheral base station that satisfies a preset condition is selected as a hand-off destination candidate.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

First Embodiment

A cellular mobile communication network system according to a first embodiment of the invention employs a code division multiple access (CDMA) scheme. A base station transmits a pilot signal. The pilot signal is diffused by a predetermined diffusion code. An initial phase offset value that varies between base stations is assigned to a diffusion code. When establishing initial synchronization with a base station upon turn-on or out of synchronization, a mobile communication terminal searches all peripheral base stations close to the terminal, using a sliding correlator. Further, when establishing synchronization in preparation for hand-off, the terminal receives pilot signals transmitted from the active base station with which synchronization is now established, and from other peripheral base stations, and measures the reception quality of the signals.

Figure 1:
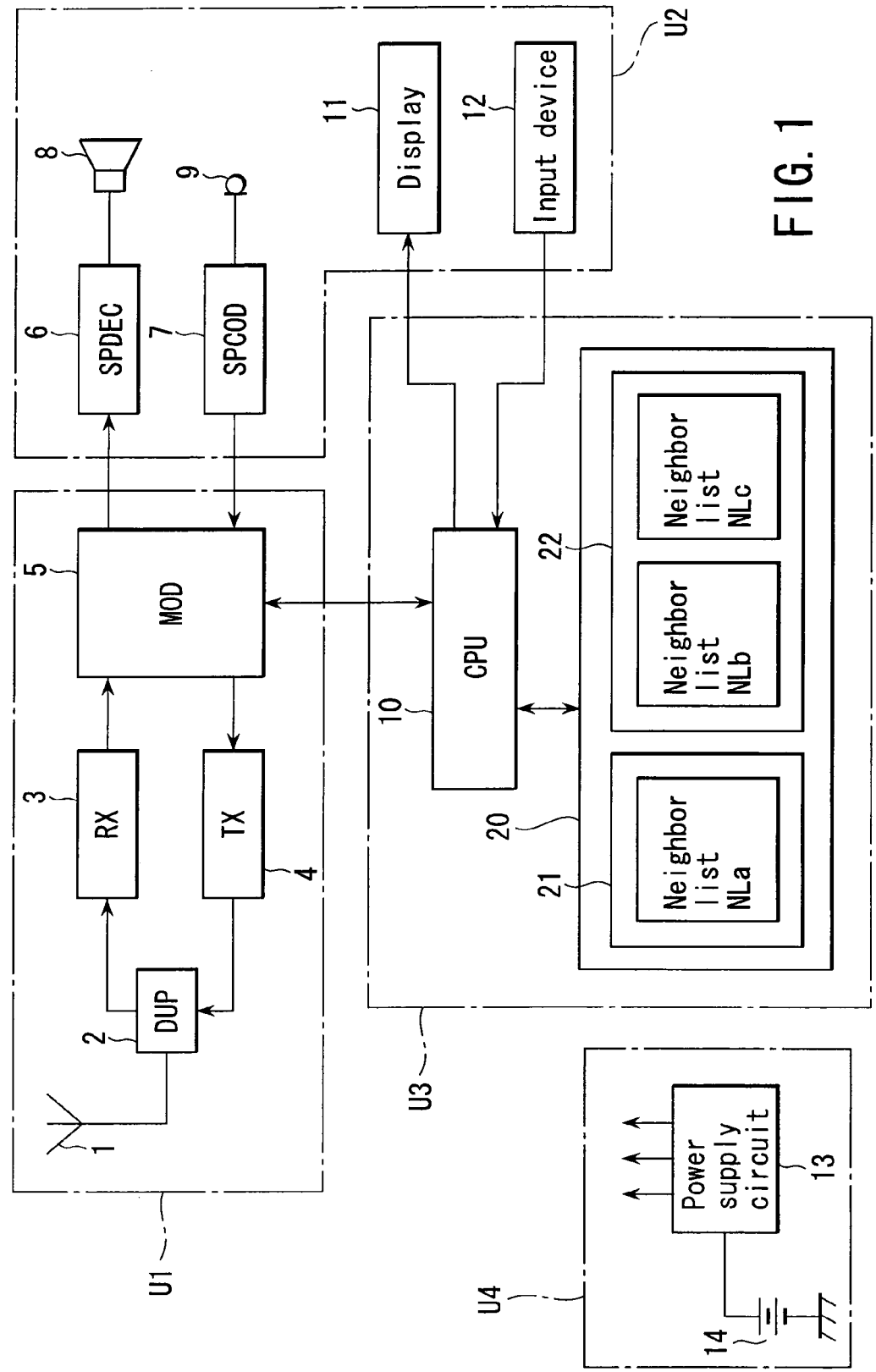
FIG. 1 is a block diagram illustrating the configuration of a mobile communication terminal according to a first embodiment of the invention.

FIG. 1 is a circuit block diagram illustrating the configuration of a mobile communication terminal according to the first embodiment. This terminal comprises a radio unit U1, input/output unit U2, control unit U3 and power unit U4.

The radio unit U1 has an antenna 1, antenna duplexer 2, reception circuit 3, transmission circuit 4 and modulation/demodulation circuit 5. The reception circuit 3 amplifies the low noise component of a radio signal received by the antenna 1, and down-converts it into an intermediate frequency signal or baseband frequency signal.

The modulation/demodulation circuit 5 converts a received signal into a digital signal, and inputs it to a RAKE receiver and search receiver. The RAKE receiver has a plurality of finger circuits and a symbol synthesizer. Each finger circuit subjects the input signal to despreading, thereby reproducing a received signal of a desired path. The symbol synthesizer adjusts the phases of signals output from the finger circuits, and subjects the signal to symbol synthesis. The resultant signal is decoded.

The search receiver has a sliding correlator. Using the sliding correlator, a diffusion code for a pilot signal transmitted from a base station is detected by searching, thereby detecting its offset value. The detection result is input to the control unit 10.

The modulation/demodulation circuit 5 subjects transmission data to orthogonal modulation and diffusion using a diffusion code, then converts the resultant signal into an analog signal, and outputs the analog signal to the transmission circuit 4. The transmission circuit 4 up-converts the input analog transmission signal into a radio frequency signal, and amplifies it. The amplified signal is output to the antenna 1 via the antenna duplexer 2, and is transmitted therefrom to a base station.

The input/output unit U2 comprises a speech decoder 6, speech coder 7, speaker 8, microphone 9, display 11 and input device 12. The display 11 is formed of an LCD, and the input device 12 is formed of a dial keypad.

The speech decoder 6 has a digital/analog converter and driver. The decoder 6 converts, into an analog signal, reception data demodulated by the modulation/demodulation circuit 5, thereby amplifying it and output it as voice through the speaker 8. The speech coder 7 has a speech amplifier and analog/digital converter. The coder 7 amplifies the speech signal output from the microphone 9, thereby converting it into transmission data as a digital signal, and supplying it to the modulation/demodulation circuit 5.

The control unit U3 comprises a central processing unit (CPU) 10 and memory 20. The memory 20 is formed of, for example, a flash memory or RAM. The memory 20 has first and second memory areas 21 and 22 for storing neighbor lists. Specifically, the first memory area 21 stores a neighbor list NLa acquired from the active base station with which synchronization is now established. The second memory area 22 stores neighbor lists NLb and NLc acquired from two base stations with which synchronization was established before. The neighbor lists NLb and NLc acquired from the past two base stations are called expanded neighbor lists.

The CPU 10 has a neighbor-list storage control function, base-station selection control function and hand-off control function as control functions for realizing the first embodiment.

The neighbor-list storage control function acquires a neighbor list NLa from the active base station with which synchronization is now established, each time initial synchronization is established or active-base-station change occurs as a result of hand-off. The thus-acquired neighbor list NLa is stored in the first memory area 21. Before storing the newest neighbor list NLa, the neighbor lists NLa and NLb stored in the first and second memory areas 21 and 22 are all stored in the second memory area 22 as expanded neighbor lists NLb and NLc.

The base-station selection control function reads the neighbor list LNa and expanded neighbor lists NLb and NLc from the first and second memory areas 21 and 22, and measures the reception quality of the peripheral base stations listed in the neighbor lists NLa, NLb and NLc. The measurement of reception quality is performed by detecting the SIRs of signals transmitted from the respective peripheral base stations. The measured reception quality levels are compared with a preset threshold value. If a certain reception quality level is higher than the threshold value, the peripheral base station corresponding to the reception quality level is selected and stored as a hand-off destination candidate. If there are several reception quality levels higher than the threshold values, the peripheral base station corresponding to the highest reception quality level is selected as the hand-off destination candidate. In this case, the peripheral base stations corresponding to reception quality levels lower than the highest level and higher than the threshold value are stored as substitutes.

The hand-off control function periodically measures the reception quality of the active base station with which synchronization is now established, and compares the measured reception quality with a preset maintenance reference value. If it is determined as a result of comparison that the measured reception quality becomes less than the maintenance reference value, the reception quality of a peripheral base station stored as a hand-off destination candidate is measured and compared with the maintenance reference value and a preset hand-off reference value. If the former is not less than the hand-off reference value or maintenance reference value, the mobile communication terminal and active base station cooperate to perform processing for the terminal to hand off from the active base station to the hand-off destination candidate. On the other hand, if the measured reception quality is less than the hand-off reference value or maintenance reference value, an unspecified number of base stations existing in all cells are searched, and synchronization is established with a base station of the best reception quality detected by this searching.

The power unit U4 comprises a power supply circuit 13 and battery 14. From the output of the battery 14, the power supply circuit 13 generates a DC voltage needed for operating the units U1, U2 and U3.

Figure 2:
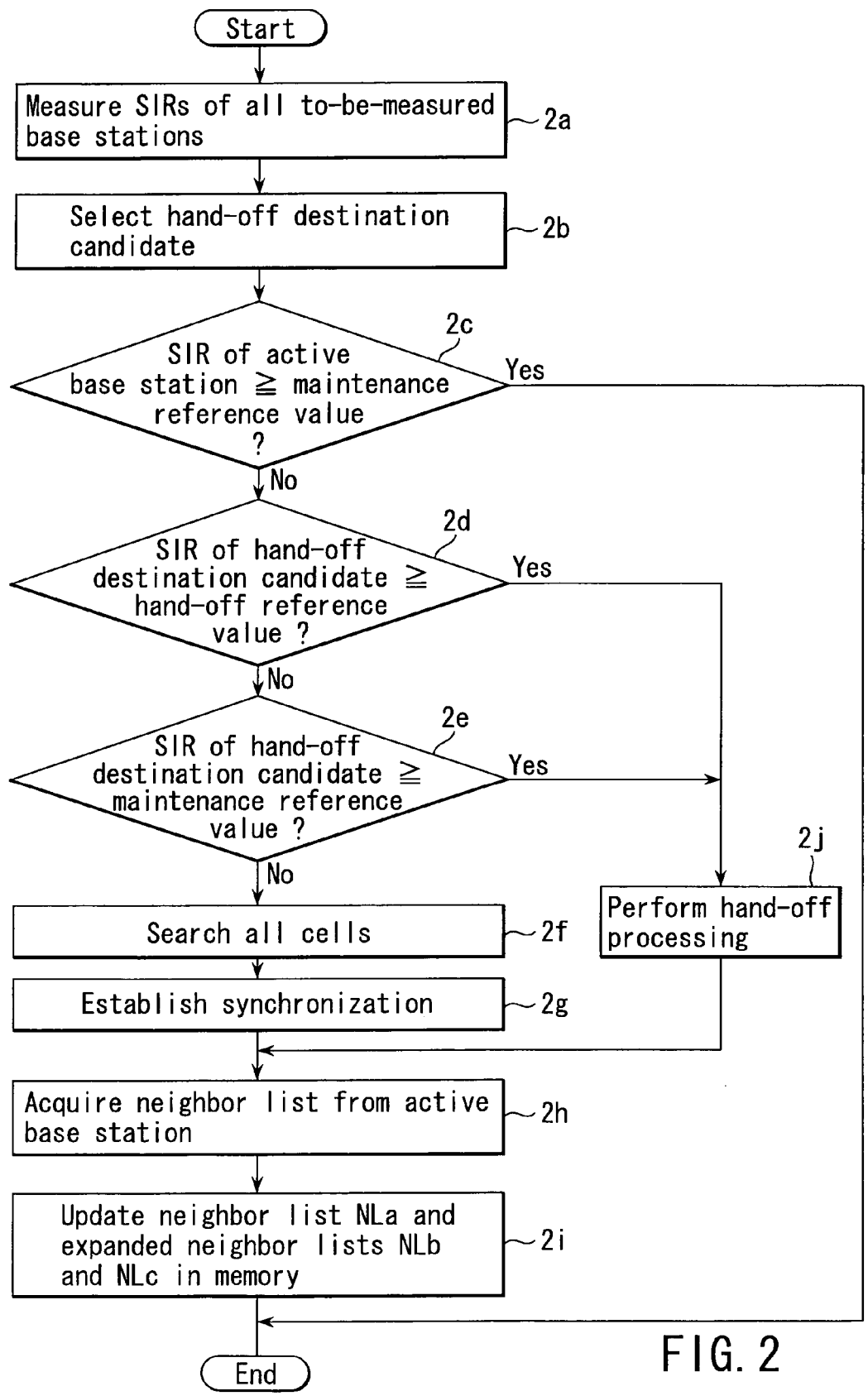
FIG. 2 is a flowchart illustrating the procedure and contents of base-station selecting control performed by the mobile communication terminal of FIG. 1.

The operation of the mobile communication terminal constructed as above that is related to hand-off will now be described. FIG. 2 is a flowchart illustrating the control procedure and control contents of the CPU 10.

The first memory area 21 already stores a neighbor list NLa acquired from the active base station with which synchronization is now established, and the second memory area 22 already stores neighbor lists NLb and NLc acquired from two base stations with which synchronization was established before.

In this state, the CPU 10 measures the reception quality levels of all to-be-measured base stations at a step 2a. Firstly, the CPU 10 causes the radio unit U1 to receive a pilot signal transmitted from the active base station with which synchronization is now established, and measures the SIR of the received signal. Subsequently, the CPU 10 reads the neighbor list NLa from the first area 21 of the memory 20, thereby causing the radio unit U1 to receive a pilot signal transmitted from each peripheral base station listed in the read neighbor list NLa, and measuring the SIR of the signal. Furthermore, the CPU 10 reads the expanded neighbor lists NLb and NLc from the second area 22 of the memory 20, thereby causing the radio unit U1 to receive a pilot signal transmitted from each peripheral base station listed in the read neighbor lists NLb and NLc, and measuring the SIR of the signal.

Thereafter, the CPU 10 selects a peripheral base station as a hand-off destination candidate at a step 2b. Specifically, the CPU compares the SIR measured at the step 2a with a preset threshold value, and selects a peripheral base station of the best reception quality from the peripheral base stations having reception quality levels not less than the threshold value, thereby storing the selected base station as a hand-off destination candidate.

When determining whether hand-off processing should be performed, the CPU 10 causes, at a step 2c, the radio unit U1 to receive a pilot signal transmitted from the active base station with which synchronization is now established, measures the SIR of the received signal, and compares the measured SIR with a preset maintenance reference value. If it is determined as a result of comparison that the measured SIR is not less than the maintenance reference value, the processing is returned to the standby processing. If, on the other hand, the measured SIR becomes less than the maintenance reference value, the CPU 10 measures, at a step 2d, the SIR of a pilot signal from the peripheral base station stored as the hand-off destination candidate, and compares the measured SIR with the preset hand-off reference value. If the measured SIR is not less than the hand-off reference value, the CPU 10 proceeds to a step 2j where it performs hand-off processing. Hand-off processing is executed when the CPU issues a hand-off request to the active base station with which synchronization is now established, and receives an instruction to perform hand-off processing, issued from the active base station in response to the hand-off request. The hand-off request contains identification information indicating a peripheral base station as a hand-off destination candidate.

If, on the other hand, the SIR of a pilot signal from the peripheral base station as the hand-off destination candidate is less than the hand-off reference value, the CPU 10 proceeds to a step 2e where the measured SIR is compared with the maintenance reference value. If the measured SIR is not less than the maintenance reference value, the CPU 10 proceeds to the step 2j, thereby performing the above-mentioned hand-off processing.

If the measured SIR is less than the maintenance reference value, the CPU 10 proceeds to a step 2f, thereby searching an unspecified number of base stations existing in all cells, and selecting the base station of the highest SIR. At a step 2g, the CPU 10 establishes synchronization with the selected base station.

After establishing synchronization with the new base station, the CPU 10 proceeds to a step 2h where it acquires a neighbor list NLa from the new active base station. At a step 2i, the CPU 10 updates the neighbor list NLa stored in the first memory area 21, and the expanded neighbor lists NLb and NLc stored in the second memory area 22.

The acquisition of a neighbor list NLa from a new active base station (step 2h), and the update of the neighbor lists NLa, NLb and NLc in the memory 20 (step 2i) are also performed after the execution of the hand-off processing (step 2j).

As described above, in the first embodiment, each time the present active base station as a synchronization destination is changed to a new one, a neighbor list NLa is acquired from the present active base station and stored in the first memory area 21 of the memory 20. At the same time, two, at maximum, of the neighbor lists, stored so far in the first and second memory areas 21 and 22, are then stored in the second memory area 22. When a peripheral base station as a hand-off destination candidate is selected, the neighbor list NLa and expanded neighbor lists NLb and NLc are read from the first and second memory areas 21 and 22, and the reception quality levels (SIRs) of the peripheral base stations listed in these lists are measured. Based on the measurement results, the peripheral base stations having SIRs higher than the threshold value are selected as hand-off destination candidates.

Thus, the selection targets as hand-off destination candidates are not limited to the peripheral base stations listed in the neighbor list NLa acquired from the present active base station, but are expanded to those listed in the neighbor lists NLb and NLc acquired from the past two active base stations. Accordingly, the probability of selecting an appropriate peripheral base station is increased. This being so, even in a place, such as a city or mountain place, in which the transmission line environment easily varies, the degree of necessity of searching all cells is lowered, which suppresses the power consumption of mobile communication terminals and increases the lives of batteries.

Further, to expand the selection target range of hand-off destination candidates, it is not necessary to acquire position information concerning the mobile communication terminal, or to acquire a neighbor list from a peripheral base station other than the active base station. Therefore, the power used for these purposes can be saved.

Second Embodiment

In a second embodiment of the invention, when selecting a peripheral base station as a hand-off destination candidate, firstly, the peripheral base stations listed in the neighbor list NLa stored in the first memory area 21 are subjected to reception quality measurement. If no appropriate hand-off destination candidate is detected from the measurement results, the reception quality levels of the peripheral base stations listed in the expanded neighbor lists NLb and NLc are measured to select a hand-off destination candidate.

Figure 3:
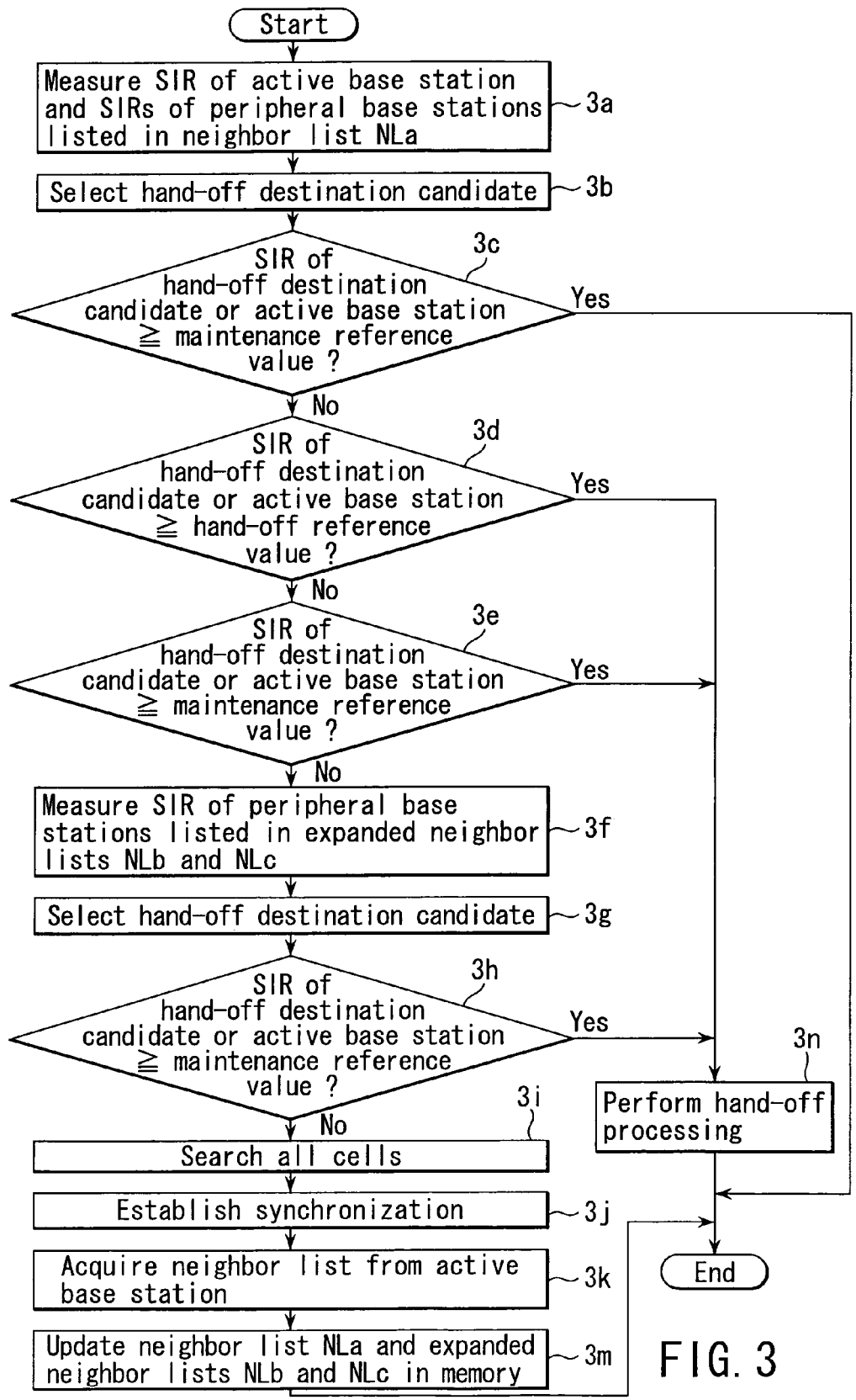
FIG. 3 is a flowchart illustrating the procedure and contents of base-station selecting control performed by a mobile communication terminal according to a second embodiment of the invention.
Figure 4:
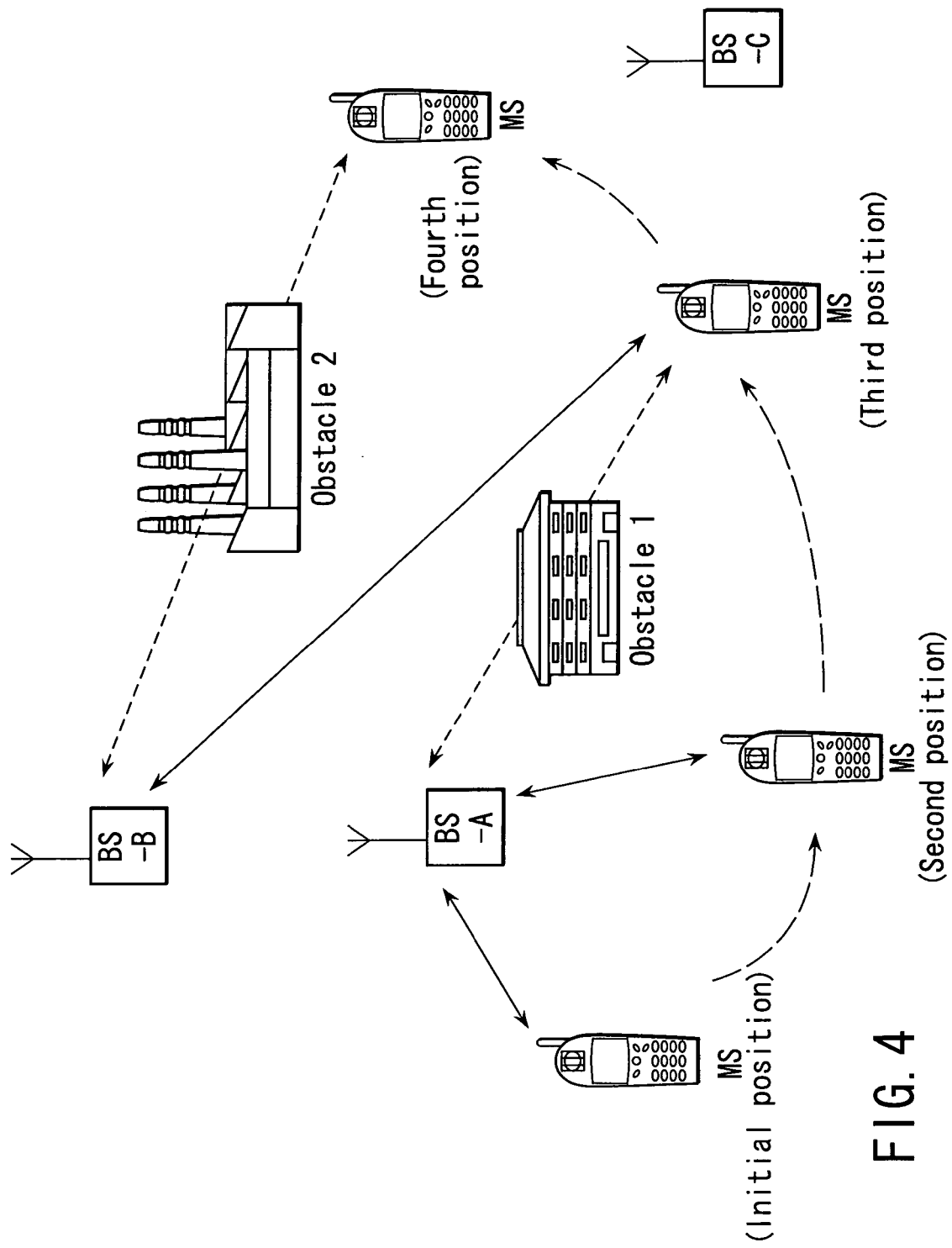
FIG. 4 is a view useful in explaining problems in prior art.

FIG. 3 is a flowchart illustrating the procedure and contents of base-station selecting control performed by a mobile communication terminal according to the second embodiment of the invention. Since the mobile communication terminal of the second embodiment has the same configuration as that shown in FIG. 1, the configuration of the second embodiment will be described with reference to FIG. 1.

The first memory areas 21 already stores a neighbor list NLa acquired from the active base station with which synchronization is now established, and the second memory area 22 already stores neighbor lists NLb and NLc acquired from two base stations with which synchronization was established before.

In this state, the CPU 10 causes the radio unit U1 to receive a pilot signal transmitted from the active base station with which synchronization is now established, and measures the SIR of the received signal (step 3a). Subsequently, the CPU 10 reads the neighbor list NLa from the first area 21 of the memory 20, thereby causing the radio unit U1 to receive a pilot signal transmitted from each peripheral base station listed in the read neighbor list NLa, and measuring the SIR of the signal.

At a step 3b, the CPU 10 compares the measured SIR with a preset threshold value, selects a peripheral base station of the best reception quality from the peripheral base stations having SIRs higher than the threshold value, and stores it as a hand-off destination candidate.

When determining whether hand-off processing should be performed, the CPU 10 causes, at a step 3c, the radio unit U1 to receive a pilot signal transmitted from the active base station with which synchronization is now established, measures the SIR of the received signal, and compares the measured SIR with a preset maintenance reference value. If it is determined as a result of comparison that the measured SIR is not less than the maintenance reference value, the processing is returned to the standby processing. If, on the other hand, the measured SIR becomes less than the maintenance reference value, the CPU 10 measures, at a step 3d, the SIR of the peripheral base station stored as the hand-off destination candidate, and compares the measured SIR with a preset hand-off reference value. If the measured SIR is not less than the hand-off reference value, the CPU 10 proceeds to a step 3n where it performs hand-off processing.

If, on the other hand, the SIR of the peripheral base station as the hand-off destination candidate is less than the hand-off reference value, the CPU 10 proceeds to a step 3e where the measured SIR is compared with the maintenance reference value. If the measured SIR is not less than the maintenance reference value, the CPU 10 proceeds to the step 3n, thereby performing hand-off processing.

If the measured SIR is less than the maintenance reference value, the CPU 10 proceeds to a step 3f, where it reads the expanded neighbor lists NLb and NLc from the second memory area 22 of the memory 20, thereby causing the radio unit U1 to receive pilot signals from the peripheral base stations listed in the read neighbor lists, and measuring the SIR of each received signal.

Subsequently, the CPU 10 compares the measured SIR with a preset threshold value, thereby selecting a peripheral base station of the best reception quality from the peripheral base stations having reception quality levels higher than the threshold value, and storing it as a hand-off destination candidate (step 3g).

Thereafter, the CPU 10 proceeds to a step 3h, where it compares, with a maintenance reference value, the measured SIR of the peripheral base station selected as a hand-off destination candidate from the expanded neighbor lists NLb and NLc. If it is determined as a result of comparison that the measured SIR is not less than the maintenance reference value, the CPU 10 proceeds to the step 3n, thereby executing hand-off processing.

On the other hand, if the measured SIR is less than the maintenance reference value, the CPU 10 proceeds to a step 3i, thereby searching an unspecified number of base stations existing in all cells. From the search results, the CPU 10 selects a base station corresponding to the highest SIR. At the nest step 3*j*, the CPU 10 establishes synchronization with the selected base station.

Upon establishing synchronization with the new base station, the CPU 10 acquires a neighbor list NLa from the new active base station at a step 3*k*. At the next step 3*m*, the CPU 10 updates the neighbor list NLa stored in the first memory area 21 of the memory 20, and the expanded neighbor lists NLb and NLc stored in the second memory area 22.

The acquisition of a neighbor list NLa from a new active base station (step 3*k*), and the update of the neighbor lists NLa, NLb and NLc in the memory 20 (step 3*m*) are also performed after the execution of the hand-off processing (step 3*n*).

As described above, in the second embodiment, when selecting a peripheral base station as a hand-off destination candidate, firstly, the reception quality of each peripheral base station listed in the neighbor list NLa stored in the first memory area 21 is measured. If a peripheral base station that satisfies the condition is not found, the reception quality of each peripheral base station listed in the expanded neighbor lists NLb and NLc stored in the second memory area 22 is measured to select the hand-off destination candidate.

As described above, only when an appropriate one as a hand-off destination candidate is not found in the peripheral base stations listed in the neighbor list NLa acquired from the active base station with which synchronization is now established, the peripheral base stations listed in the expanded neighbor lists NLb and NLc are searched. Therefore, the power required for searching peripheral base stations can be reduced and hence the battery life can be further lengthened, compared to the case where all peripheral base stations listed in the neighbor list NLa and expanded neighbor lists NLb and NLc are simultaneously searched. This also leads to the shortening of the time required to select a peripheral base station as a hand-off destination candidate (i.e., the required hand-off processing time).

Other Embodiments

In the above-described embodiments, all peripheral base stations listed in the neighbor list NLa and expanded neighbor lists NLb and NLc are searched unconditionally. However, the peripheral base stations listed in the neighbor list NLa may overlap those listed in the expanded neighbor lists NLb and NLc. Further, the peripheral base stations listed in the expanded neighbor list NLb may overlap those listed in the expanded neighbor list NLc. In light of this, when searching the peripheral base stations listed in the expanded neighbor lists NLb and NLc, the overlapping ones are excluded so that only the different ones are searched.

This prevents the same peripheral base station from being searched doubly, thereby enabling an appropriate peripheral base station as a hand-off destination candidate to be selected by a smaller number of searching operations and hence in a shorter time (the required hand-off processing time can be reduced). In other words, the power required for searching peripheral base stations can be further reduced, and the battery life can be further lengthened.

Further, priority levels may be set for the peripheral base stations listed in the expanded neighbor lists. In this case, the peripheral base stations are searched in the order of priority. Each time one peripheral base station is searched, the SIR of the station may be compared with a threshold value, and if the SIR is not less than the threshold value, this peripheral base station may be instantly selected as a hand-off destination candidate. The priority level can be set based on, for example, the frequency of searching operations, reception quality, the number of occasions in which the peripheral base station has been selected as a hand-off destination candidate, and the number of occasions in which the peripheral base station has been selected as a hand-off destination.

Furthermore, a plurality of search lists of different priority levels may be prepared. In this case, a searching operation is performed, beginning from the peripheral base stations listed in a search list of the highest priority level, thereby selecting one peripheral base station as a hand-off destination candidate.

This can reduce the number of searching operations performed to select a peripheral base station as a hand-off destination candidate, thereby further reducing the required hand-off processing time and power consumption, and lengthening the battery life.

In the above-described embodiments, a neighbor list NLa acquired from an active base station is stored as an expanded neighbor list until two more neighbor lists NLa are newly acquired. However, the neighbor list NLa may be stored until a number n (n$\geq$3) of more neighbor lists are newly acquired. Yet further, the expanded neighbor lists may be stored for a preset time, and erased after the present time elapses. This enables the memory to store only relatively new neighbor lists.

In addition, in the above embodiments, the SIR of a pilot signal is measured. However, the quality of communication may be measured from a power control signal contained in data transmitted from a base station via a traffic channel, or from the received electric field intensity (RSSI).

The present invention is also applicable to a mobile communication terminal that employs a communication scheme, other than CDMA in which initial synchronization is established using a sliding correlator.

The circuit configuration of the mobile communication terminal of the invention, and the procedure and contents of neighbor list acquisition control, base-station selection control and hand-off control employed in the invention may be modified in various ways without departing from the scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal for use in a cellular mobile communication system, comprising:

a circuit configured to acquire a first neighbor list from a first base station serving the mobile communication terminal in a standby mode, the first neighbor list storing data indicating a first plurality of peripheral base stations existing near the first base station;

a memory configured to store the acquired first neighbor list;

a circuit configured to acquire, if the serving base station is handed off in a standby mode from the first base station to a second base station, a second neighbor list from the second base station that is the serving base station after the handing-off, the second neighbor list storing data indicating a second plurality of peripheral base stations existing near the second base station;

a circuit configured to additionally store the acquired second neighbor list in the memory;

a setting circuit configured to set priority levels for the peripheral base stations listed in the first and second neighbor lists stored in the memory;

a measurement circuit configured to measure, when the mobile communication terminal and the second base station are synchronized with each other, communication quality between the mobile communication terminal and each of the peripheral base stations listed in the first and second neighbor lists, in a decreasing order of priority level set by the setting circuit; and a circuit configured to select, as a hand-off destination candidate, one station from the first plurality of peripheral base stations indicated in the first neighbor list and the second plurality of peripheral base stations indicated in the second neighbor list, which satisfies a preset condition, based on the measured communication quality, wherein the first neighbor list and the second neighbor list are combined without determining characteristics of the serving base station and corresponding cell, and the memory stores the first neighbor list until a total number of occasions in which selection for selecting the hand-off destination candidate is performed reaches a preset value, and the first neighbor list is erased from the memory after the total number of occasions reaches the preset value.

2. The mobile communication terminal according to claim 1, wherein the memory stores the first neighbor list for a preset time.

3. The mobile communication terminal according to claim 1, wherein the measurement circuit measures reception quality of a pilot signal transmitted from each of the first and second pluralities of peripheral base stations.

4. The mobile communication terminal according to claim 1, wherein the measurement circuit measures the communication quality between the mobile communication terminal and each of the second plurality of peripheral base stations listed in the acquired second neighbor list, the measurement circuit also measuring the communication quality between the mobile communication terminal and those of the first plurality of peripheral base stations listed in the stored first neighbor list, which are obtained by excluding the first plurality of peripheral base stations doubly listed as the second plurality of peripheral base stations in the second neighbor list.

5. A mobile communication terminal for use in a cellular mobile communication system, comprising:

a circuit configured to acquire a first neighbor list from the first base station serving the mobile communication terminal in a standby mode, the first neighbor list storing data indicating first peripheral base stations existing near the first base station;

a memory configured to store the acquired first neighbor list;

a circuit configured to acquire, if the serving base station is changed in a standby mode from the first base station to a second base station, a second neighbor list from the second base station, the second neighbor list storing data indicating second peripheral base stations existing near the second base station;

a first measurement circuit configured to measure, when the second base station is serving the mobile communication terminal in a standby mode, communication quality between the mobile communication terminal and each of the second peripheral base stations listed in the acquired second neighbor list;

a first selection circuit configured to select, as a hand-off destination candidate, one of the second peripheral base stations, which satisfies a preset condition, based on the measured communication quality between the mobile communication terminal and each of the second peripheral base stations;

a second measurement circuit configured to measure the communication quality between the mobile communication terminal and each of the first peripheral base stations listed in the first neighbor list, if the second peripheral base stations do not satisfy the preset condition; and a second selection circuit configured to select, as the hand-off destination candidate, one of the first peripheral base stations, which satisfies the preset condition, based on the measured communication quality between the mobile communication terminal and each of the first peripheral base stations.

6. The mobile communication terminal according to claim 5, wherein the memory stores the first neighbor list until a number of occasions in which selection for selecting the hand-off destination candidate is performed reaches a preset value.

7. The mobile communication terminal according to claim 5, wherein the memory stores the first neighbor list for a preset time.

8. The mobile communication terminal according to claim 5, wherein the first and second measurement circuits measure reception quality of a pilot signal transmitted from each of the first and second peripheral base stations.

9. The mobile communication terminal according to claim 5, wherein the second measurement circuit measures the communication quality between the mobile communication terminal and those of the first peripheral base stations listed in the stored first neighbor list, which are obtained by excluding the first peripheral base stations doubly listed as the second peripheral base stations in the second neighbor list.

10. The mobile communication terminal according to claim 5, further comprising a search circuit configured to search, if the first peripheral base stations do not satisfy the preset condition, an unspecified number of peripheral base stations for a peripheral base station having communication quality which satisfies the present condition.

11. A control unit incorporated in a mobile communication terminal for use in a cellular mobile communication system, the mobile communication terminal also incorporating a radio unit configured to transmit and receive radio signals to and from base stations, the radio unit being connected to the control unit, the control unit comprising:

a first reception control section configured to make the radio unit to receive a first neighbor list from the first base station serving the mobile communication terminal in a standby mode, the first neighbor list storing data indicating a first plurality of peripheral base stations existing near the first base station;

a memory configured to store the received first neighbor list;

a second reception control section configured to make the radio unit to receive, if the serving base station is changed in a standby mode from the first base station to a second base station, a second neighbor list from the second base station, the second neighbor list storing data indicating a second plurality of peripheral base stations existing near the second base station;

a section configured to additionally store the acquired second neighbor list in the memory;

a setting section configured to set priority levels for the peripheral base stations listed in the first and second neighbor lists stored in the memory;

a measurement control section configured to measure, when the mobile communication terminal and the second base station are synchronized with each other, communication quality between the mobile communication terminal and each of the peripheral base stations listed in the first and second neighbor lists, in a decreasing order of priority level set by the setting section; and a selection section configured to select, as a hand-off destination candidate, one station from the first plurality of peripheral base stations indicated in the first neighbor list and the second plurality of peripheral base stations indicated in the second neighbor list, which satisfies a preset condition, based on the measured communication quality, wherein the first neighbor list and the second neighbor list are combined without determining characteristics of the serving base station and corresponding cell, and the memory stores the first neighbor list until a total number of occasions in which selection for selecting the hand-off destination candidate is performed reaches a preset value, and the first neighbor list is erased from the memory after the total number of occasions reaches the preset value.

12. A control unit incorporated in a mobile communication terminal for use in a cellular mobile communication system, the mobile communication terminal also incorporating a radio unit configured to transmit and receive radio signals to and from base stations, the radio unit being connected to the control unit, the control unit comprising:

a first reception control section configured to make the radio unit to receive a first neighbor list from the first base station serving the mobile communication terminal in a standby mode, the first neighbor list storing data indicating first peripheral base stations existing near the first base station;

a memory configured to store the received first neighbor list;

a second reception control section configured to make the radio unit to receive, if the serving base station is changed in a standby mode from the first base station to a second base station, a second neighbor list from the second base station, the second neighbor list storing data indicating second peripheral base stations existing near the second base station;

a first measurement control section configured to measure, when the second base station is serving the mobile communication terminal in a standby mode, communication quality between the mobile communication terminal and each of the second peripheral base stations listed in the acquired second neighbor list, based on the signal received by the radio unit;

a first selection section configured to select, as the hand-off destination candidate, one of the second peripheral base stations which satisfies a preset condition, based on the communication quality measured by the first measurement control section;

a second measurement control section configured to measure, if the second peripheral base stations do not satisfy the preset condition, communication quality between the mobile communication terminal and each of the first peripheral base stations listed in the stored first neighbor list, based on the signal received by the radio unit; and a second selection control section configured to select, as the hand-off destination candidate, one of the first peripheral base stations which satisfies the preset condition, based on the communication quality measured by the second measurement control section.

* * * * *